United States Patent
Borade et al.

(10) Patent No.: US 8,930,528 B2
(45) Date of Patent: Jan. 6, 2015

(54) METHOD AND SYSTEM FOR PARTITIONING DIRECTORIES

(75) Inventors: Rahul Ravindra Borade, Maharashtra (IN); Anindya Banerjee, Pune (IN); Kedar Patwardhan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 626 days.

(21) Appl. No.: 12/857,453

(22) Filed: Aug. 16, 2010

(65) Prior Publication Data

US 2012/0042062 A1 Feb. 16, 2012

(51) Int. Cl.
*G06F 15/173* (2006.01)
*G06F 17/30* (2006.01)

(52) U.S. Cl.
CPC .... *G06F 17/30115* (2013.01); *G06F 17/30165* (2013.01)
USPC ........... 709/224; 709/203; 709/226; 711/141; 711/146

(58) Field of Classification Search
CPC ..................... G06F 17/30115; G06F 17/30165
USPC ........................................................ 709/224
See application file for complete search history.

(56) References Cited

U.S. PATENT DOCUMENTS

| | | | |
|---|---|---|---|
| 2004/0003086 A1* | 1/2004 | Parham et al. | 709/226 |
| 2004/0215900 A1* | 10/2004 | Guthrie et al. | 711/146 |
| 2005/0149749 A1* | 7/2005 | Van Brabant | 713/200 |
| 2005/0273571 A1* | 12/2005 | Lyon et al. | 711/203 |
| 2006/0080674 A1* | 4/2006 | Bes et al. | 719/318 |
| 2007/0083715 A1* | 4/2007 | Vanderpool | 711/141 |
| 2008/0071811 A1* | 3/2008 | Parkinson et al. | 707/101 |
| 2008/0244189 A1* | 10/2008 | Allison et al. | 711/141 |
| 2009/0019514 A1 | 1/2009 | Hazlewood et al. | |
| 2009/0143046 A1* | 6/2009 | Smith | 455/404.1 |
| 2009/0178105 A1 | 7/2009 | Feng et al. | |
| 2009/0178106 A1 | 7/2009 | Feng et al. | |
| 2009/0204571 A1 | 8/2009 | Shizuno | |
| 2010/0057697 A1 | 3/2010 | Golwalkar et al. | |
| 2011/0040810 A1* | 2/2011 | Kaplan et al. | 707/822 |
| 2011/0082879 A1 | 4/2011 | Hazlewood et al. | |
| 2011/0307543 A1* | 12/2011 | Megginson | 709/203 |

OTHER PUBLICATIONS

Xing et al ("Adaptive and Scalable Metadata Management to Support a Trillion Files", Nov. 2009, ACM, all pages.*

* cited by examiner

*Primary Examiner* — Hua Fan
(74) *Attorney, Agent, or Firm* — Wilmer Cutler Pickering Hale and Dorr LLP

(57) ABSTRACT

A method of partitioning directory. Accesses, e.g., shared/exclusive, and/or waiting requests, e.g., shared/exclusive, to access one or more files with a directory are monitored, e.g., incrementing/decrementing respective counters. The waiting requests are queued to be granted at a later time. The directory is determined to be primed for partitioning if a number of waiting requests to access the directory is greater than a threshold value of a plurality of heuristics and optionally further based on satisfying the condition for at least a programmable time threshold period. A trigger signal is automatically generated if the directory is primed for partitioning. The trigger signal causes a file system to partition the directory. It is appreciated that the plurality of heuristics is user programmable.

20 Claims, 13 Drawing Sheets

METHOD AND SYSTEM FOR PARTITIONING DIRECTORIES

TECHNICAL FIELD

Embodiments of the present invention generally relate to computer systems that facilitate partitioning of directories.

BACKGROUND

Increased usage of computers and the Internet has led to an increase in sharing content, e.g., files within directories. For example, files within a directory may be accessed by one or more users, e.g., by an application, by a client, etc., simultaneously. As described below, shared access to a common directory may cause access contentions.

Any read operation on the directory (e.g., listing the contents of the directory, requesting the attributes of the directory, requesting a lookup for a specific item in the directory) requires that the entity performing the read operation has a shared access on the directory. Merely reading a file in the directory does not fall in this category. Moreover, any update operation on the directory (e.g., creating a new entry in the directory, removing an entry from the directory, updating the attributes of the directory, moving an entry from the directory to some other directory) requires that the entity performing the update operation has an exclusive access on the directory. Merely updating a file within the directory does not fall in the above category.

Unfortunately, when one entity has a shared access on the directory, no other can have an exclusive access on the directory. But others can have shared access on the directory. Moreover, when one entity has an exclusive access on the directory, no other can have exclusive or shared access on the directory. All of the above scenarios lead to serialization of accesses to the directory. As a result of serialization, access requests to the directory are queued until they can be completed without contention. This causes system performance to degrade as access requests wait.

One conventional system to reduce this wait time has been to partition a directory when the size associated with that directory reaches a threshold limit. The presumption in the conventional system is that the increase in directory size is followed by an increase in the number of shared accesses, the number of exclusive accesses, the number of shared access requests, and the number of exclusive access requests. Thus, partitioning directories based on size is conventionally deemed to alleviate the surge in the number of accesses and the number of access requests.

Unfortunately, partitioning directories based on size does not necessarily alleviate the surge in the number of accesses and the number of access requests. In other words, directory size has shown to have no correlation with the number of accesses and the number of access requests on the directory. For example, a directory may be small in size but it may have many accesses and access requests that will lead to serialization of the access requests, thereby increasing the wait time to process access requests. On the other hand, a directory may be very large in size but may have very few accesses and very few access requests that do not lead to excessive serialization of access requests. Thus, partitioning the directory based on its size does not always improve efficiency nor reduce wait time in processing access requests.

SUMMARY

Accordingly, a need has arisen to partition a directory in response to a surge in the number of accesses and/or the number of access requests. Moreover, a need has arisen to partition a directory to increase system throughput of accesses and/or access requests. It will become apparent to those skilled in the art after reading the detailed description of the present invention that the embodiments of the present invention satisfy the above mentioned needs.

According to one embodiment, directory partition logic monitors directory accesses and/or directory access requests (e.g., queued or "waiting" accesses). For example, the number of accesses and/or the number of access requests may be monitored. Directory accesses and directory access requests may be either shared or exclusive. A partitioning trigger signal that causes the file system to partition the directory is generated if the number of directory access requests (e.g., waiting accesses) satisfy one or more conditions set by a plurality of heuristics.

For example, the partitioning trigger signal may be generated in accordance with embodiments of the present invention if the number of exclusive access requests reaches a threshold value identified by the plurality of heuristics. In one example, the partitioning trigger signal may be generated if the number of shared access requests reaches a threshold value identified by the plurality of heuristics. It is appreciated that the partitioning trigger signal may be generated in response to any combination of exclusive access requests and shared access requests exceeding a threshold value.

Moreover, it is appreciated that the partitioning trigger signal may be generated if the condition identified by the number of number of access requests is satisfied over a duration of time, e.g., over a threshold period of time. The plurality of heuristics may be user definable and user programmable.

Advantageously, based on the partitioning trigger signal, the file system may automatically partition the directory into multiple subdirectories. In one embodiment, the file system may generate one or more hash values, or one or more hash value ranges, which serve as the created subdirectories. Hash values may be based on content, e.g., directories, files, etc., to be placed within the created subdirectory. Accordingly, files or subdirectories under the directory being partitioned may be placed under one or more of the created subdirectory hash values. It is appreciated that the partitioning of the directory may be based on multiple factors to reduce the wait time to service access, e.g., the number of exclusive and/or shared to a given file and/or subdirectory, etc. Moreover, directory partitioning is performed in a manner to accommodate more users simultaneously in comparison to the conventional system.

More specifically, a method of partitioning a directory includes monitoring accesses to one or more content with a directory. In one embodiment, waiting access requests to access the one or more content within the directory are monitored. The waiting requests are queued to be granted at a later time. According to one embodiment, the directory is determined to be primed for partitioning if a number of waiting requests within the directory is greater than a threshold value of a plurality of heuristics. A trigger signal is automatically generated if the directory is primed for partitioning. In one embodiment, the trigger signal causes a file system to partition the directory. It is appreciated that the plurality of heuristics may be user programmable.

According to one embodiment, monitoring waiting or queued requests to access the one ore more content within the directory includes incrementing a waiting access counter for every waiting request that is queued. The waiting access counter is decremented for every queued waiting request that is subsequently granted access to one or more content within the directory.

It is appreciated that waiting requests to access the one or more content within the directory may include shared access requests and/or exclusive access requests. In one implementation, monitoring waiting or queued requests includes examining the size of a wait queue for reader-writer lock on the directory.

In another embodiment of the present invention, the partition trigger signal is not generated unless the queued access count exceeds a threshold value over a specified period of time. It is further appreciated that the amount of time may be tracked that the number of waiting or queued requests to access the one or more content within the directory exceeds the threshold value. It is further appreciated that in one exemplary embodiment, the directory is determined to be primed for partitioning if the amount of time exceeds a time threshold associated with the plurality of heuristics. In one embodiment, determining if the queued access count exceeds a threshold count over a threshold time period is performed by examining the number of waiters from a reader-write lock queue and maintaining the queue count in a log, such as a file change log, along with a timestamp and subsequently checking the log to determine the number of such occurrences within the threshold period of time exceed a prescribed threshold.

DETAILED DESCRIPTION

Figure 1:
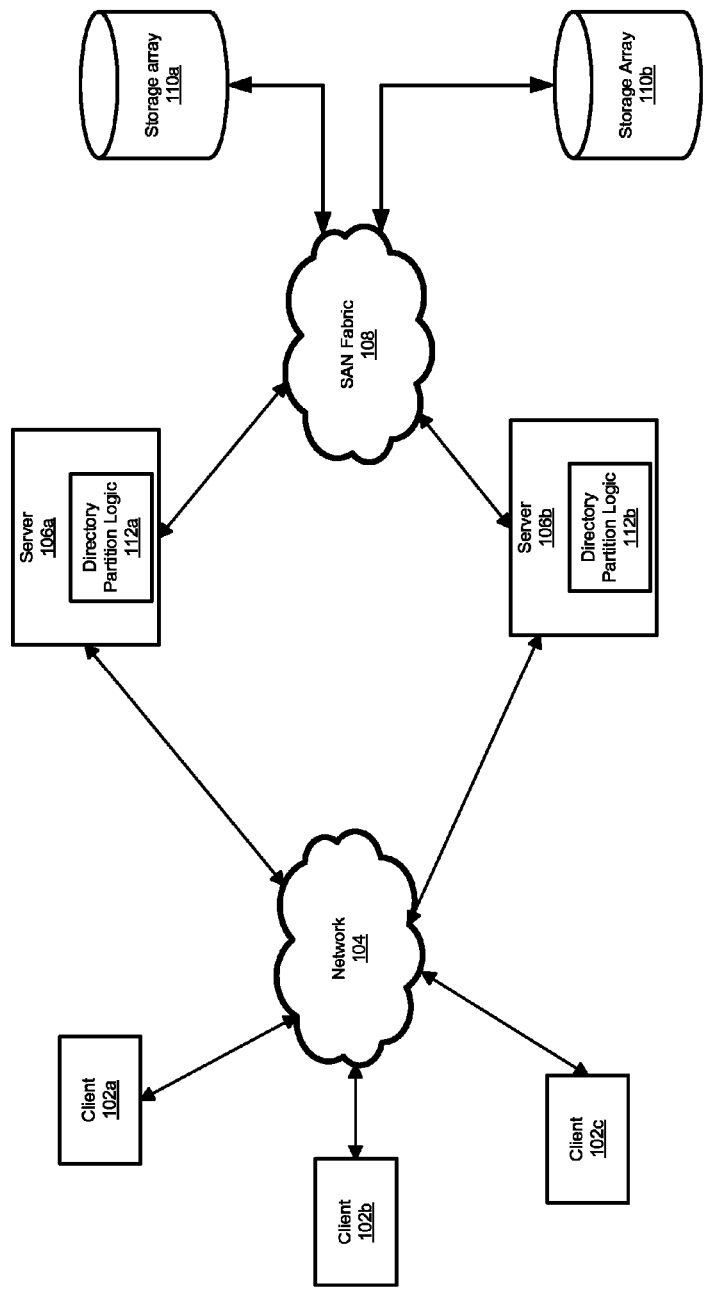
FIG. 1 shows a block diagram of an exemplary computer system operating environment, in accordance with one embodiment of the present invention.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "identifying," "creating," "generating," "monitoring," "storing," "determining," "sending," "incrementing," "providing," "decrementing," "accessing," "associating," or "tracking" or "partitioning" or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Exemplary Operating Environment

FIG. 1 shows a block diagram of an exemplary operating environment in which various embodiments of the present invention can operate. Exemplary operating environment 100 includes clients 102a-c, networks 104, servers 106a-b, storage area network (SAN) fabric 108, and storage arrays 110a-b. It is appreciated that components of exemplary operating environment 100 are exemplary and more or fewer components may be present in various configurations. It is appreciated that operating environment may be part of a distributed computing environment, a cloud computing environment, a client server environment, etc.

Client systems 102a-c access information on storage arrays 110a-b via servers 106a-b using, for example, a web browser or other suitable client communication software (not shown). FIG. 1 depicts the use of a network 104 such as the Internet for exchanging data, but the present disclosure is not limited to the Internet or any particular network-based environment.

Each of servers 106a-b can have multiple clients (e.g., clients 102a-c) connected thereto. Servers 106a-b can be a variety of server types including, but not limited to, database servers, network file system (NFS) servers, and application servers. In some embodiments, servers 106a-b have access to shared storage of storage arrays 110a-b with each of servers 106a-b having its own respective clustered file system and its own built-in lock manager thereby allowing servers 106a-b to access the shared storage. Each of servers 106a-b may communicate with each other over a network (e.g., a redundant private network) (not shown). Servers 106a-b may be linked to storage arrays 110a-b in a variety of ways including, fibre channel.

In accordance with embodiments of the present invention, servers 106a-b may respectively use directory partition logics 112a-b to determine whether a directory is primed for partitioning. If a directory is primed for partitioning, the directory partition logics 112a-b automatically generate a partitioning trigger signal that causes a file system to partition the directory. Subdirectories may be created based on hash value ranges associated with the name of the content within each subdirectory. One or more of the content of the original directory may be newly placed under a subdirectory with a particular hash value or hash value range. Accordingly, accessing a created subdirectory, e.g., via an exclusive access request, does not turn the partitioned directory inaccessible to other users, applications, threads, etc. Thus, the number of simultaneous accesses to the partitioned directory is increased, thereby reducing the wait time associated with an access request and the granting of the whether the request is exclusive or shared.

The directory partition logics 112a-b determine whether a directory is primed for partitioning by monitoring the number of directory access requests. Directory access requests may be shared and/or exclusive. In one embodiment, a partitioning trigger signal causing the file system to partition the directory is generated if the number of directory access requests satisfies one or more conditions set by a plurality of heuristics.

For example, the partitioning trigger signal may be generated in accordance with embodiments of the present invention if the number of exclusive access requests reaches a threshold value identified by the plurality of heuristics. In one example, the partitioning trigger signal may be generated if the number of shared access requests reaches a threshold value identified by the plurality of heuristics. It is appreciated that the partitioning trigger signal may be generated in response to any combination of exclusive access requests and shared access requests exceeding a threshold value.

Moreover, it is appreciated that the partitioning trigger signal may be generated if the condition identified by the number of number of access requests is satisfied over a duration of time, e.g., over a threshold period of time. The plurality of heuristics may be user definable and user programmable.

Advantageously, based on the partitioning trigger signal, the file system may automatically partition the directory into multiple subdirectories. In one embodiment, the file system may generate one or more hash values, or one or more hash value ranges, which serve as the created subdirectories. Hash values may be based on content, e.g., directories, files, etc., to be placed within the created subdirectory. Accordingly, files or subdirectories under the directory being partitioned may be placed under one or more of the created subdirectory hash values. It is appreciated that the partitioning of the directory may be based on multiple factors to reduce the wait time to service access, e.g., the number of exclusive and/or shared to a given file and/or subdirectory, etc. Moreover, directory partitioning is performed in a manner to accommodate more users simultaneously in comparison to the conventional system.

A Method and System for Partitioning Directories

Referring now to FIGS. 2A-2E, exemplary embodiments for partitioning a directory in accordance with embodiments of the present invention are shown. Exemplary system 200A includes a memory component 210, directory partition logic 220 in accordance with embodiments of the present invention and a file system 230.

Memory component 210 stores content, e.g., files. Content may be structured in a tree structure format, e.g., directories, where each directory may include one or more files and/or directories. According to one embodiment, directory partition logic 220 monitors access requests to the directory, e.g., /home directory, stored in the memory component 210. Based on the monitoring, the directory partition logic 220 determines whether the /home directory is primed for partitioning. The directory partition logic 220 generates a partitioning trigger signal if the /home directory is primed for partitioning. The partitioning trigger signal then causes the file system 230 to partition the /home directory.

It is appreciated that references to partitioning the /home directory are exemplary and not intended to limit the scope of the present invention. The method by which the /home directory is partitioned is equally applicable to partitioning other directories.

Figure 2A:
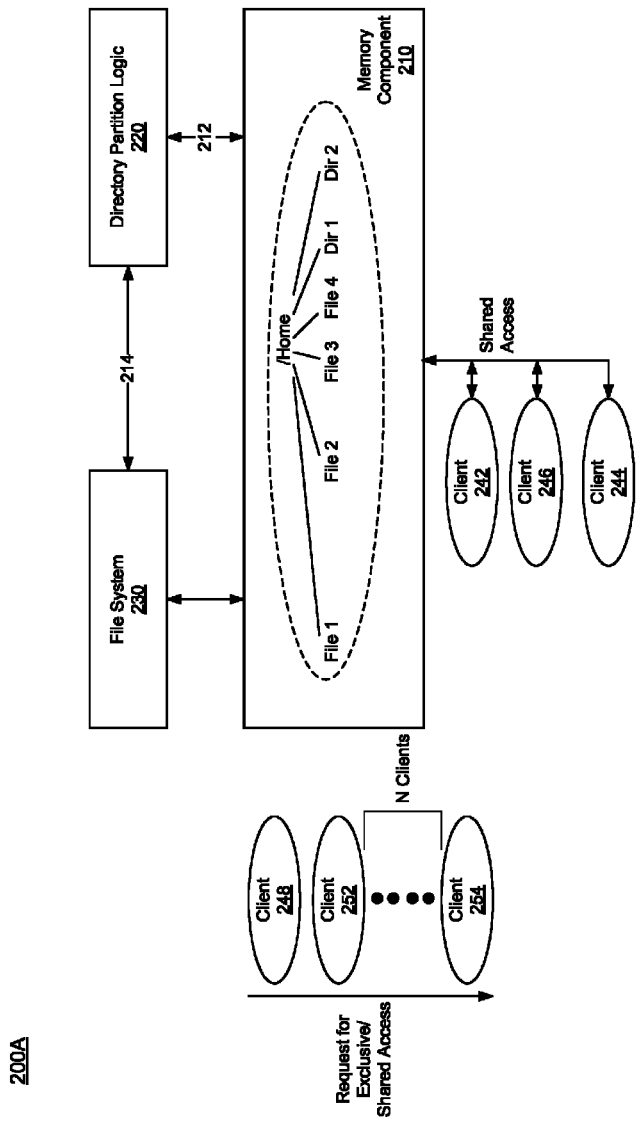
FIGS. 2A-2E show exemplary embodiments and examples for partitioning a directory in accordance with embodiments of the present invention.

The memory component 210 stores the /home directory and content therein. For example, the /home directory may include File 1, File 2, File 3, File 4, Dir 1, and Dir 2, as shown in FIG. 2A.

It is appreciated that various clients, users, applications, threads, etc., are generically referenced as to clients herein. Clients may request access to the /home directory, e.g., for a read operation, for an update operation, etc. It is appreciated that shared access is needed for a read operation that may include listing of the content within the /home directory, retrieving attributes associated with the /home directory, looking up a specific item in the /home directory, etc. It is further appreciated that an exclusive access is need for an update operation that may include creating a new entry in the /home directory, removing an entry form the /home directory, updating the attributes associated with the /home directory, moving an entry from the /home directory to another directory, etc. For example, clients 242, 246, and 244 may request shared access for their respective read operations.

It is appreciated that the structure of the /home directory does not allow an exclusive access to be granted simultaneous with other types of accesses. For example, an update operation that needs an exclusive access to the /home directory cannot occur simultaneous with shared accesses to the /home directory. Accordingly, exclusive access requests by clients 248, 252, and 254 are queued to be granted at a later time. Exclusive access request by client 248 may be to update attributes associated with the /home directory while exclusive access request by client 252 may be to remove an entry from the /home directory. Access request by client 254 may be to move an entry within the /home directory to a different directory.

As the amount of content within a directory grows, the number of access requests may increase. Thus, the amount of wait time for the request to be granted may also increase.

In one embodiment, the directory partition logic 220 monitors the number of access requests. For example, the directory partition logic 220 may monitor 212 the number of access requests, e.g., shared and/or exclusive, that are queued to be granted. The directory partition logic 220 automatically determines whether the /home directory is primed for partitioning based on monitoring the number of access requests.

Figure 3A:
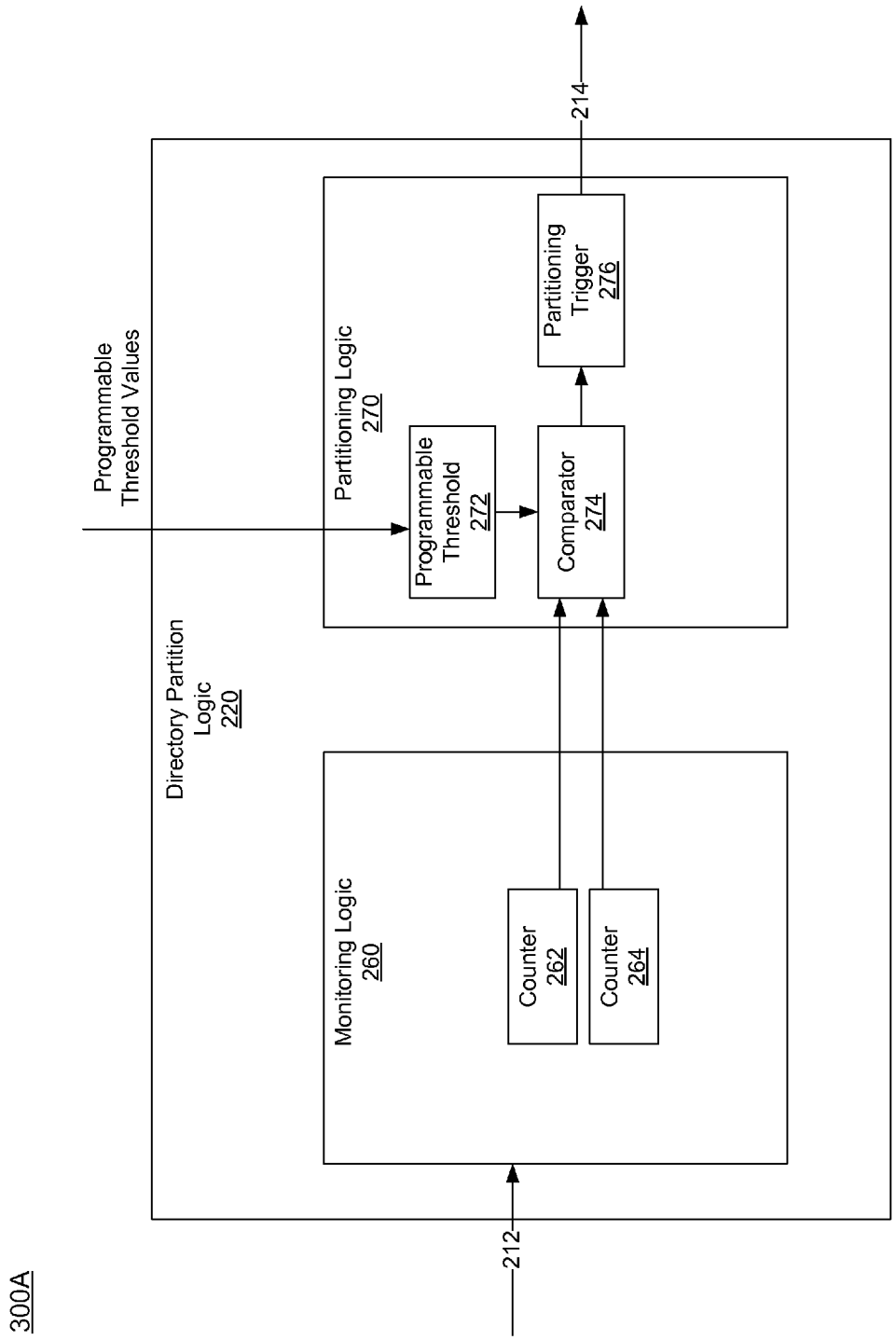
FIGS. 3A-3B show exemplary embodiments of directory partition logic in accordance with embodiments of the present invention.
Figure 3B:
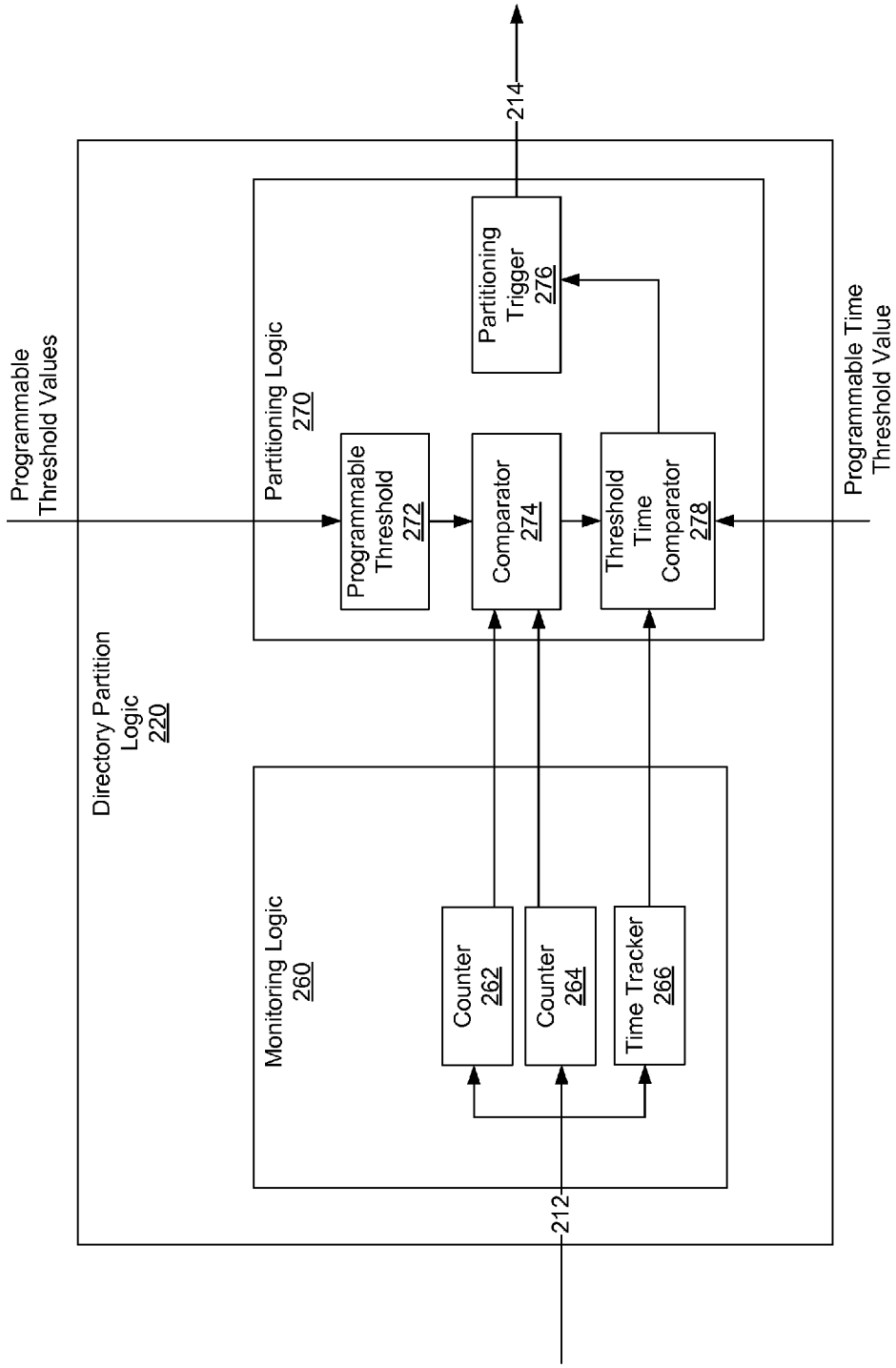

The determination of whether the /home directory is primed for partitioning is described in more detail with references to FIGS. 3A-3B. According to one embodiment, the directory partition logic 220 generates a partitioning trigger signal 214 (hereinafter trigger signal) causing the file system 230 to partition the /home directory if the /home directory is primed for partitioning.

Figure 2B:
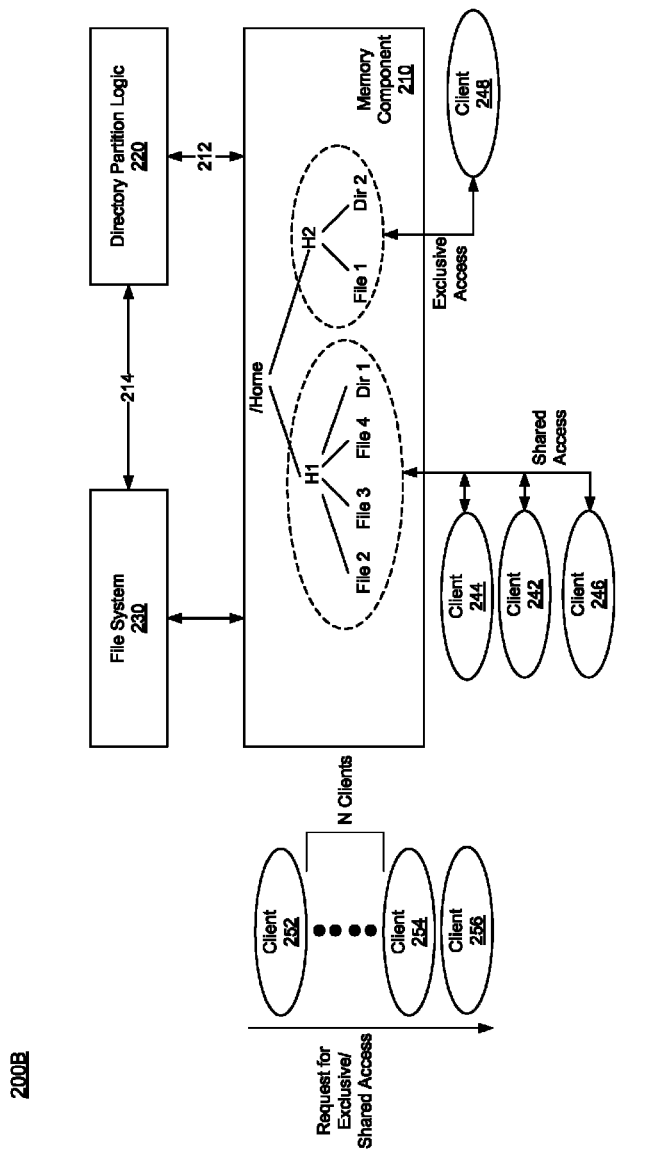

Referring now to FIG. 2B, an example partitioning of the /home directory in accordance with one embodiment is shown. For example, H1 and H2 subdirectories are created. Files 2-4 and Dir 1 are placed within the H1 subdirectory. In comparison File 1 and Dir 2 are placed within the H2 subdirectory.

In one embodiment, the names of the newly generated subdirectories are based on hash functions associated with the names of the files within each subdirectory. For example, H1 subdirectory may be associated with hashing the name of the Files 2-4 and Dir 1. In comparison, the H2 subdirectory may be associated with hashing file 1 and Dir 2. It is appreciated that the generated subdirectories may be associated with a range of hash function values. For example, a file, e.g., File 5 (not shown), that is subsequently added to /home directory may be placed in the H1 subdirectory if hashing the name of the File 5 results in a hash value within a range specified by H1.

Partitioning the /home directory may accommodate additional users/clients. For example, client 248 that was previously queued to exclusively access to /home directory can now exclusively access subdirectory H2 because creating or removing a file associated with the H2 subdirectory is in a different subdirectory in comparison to simultaneous shared accesses by clients 242, 246 and 244 accessing the H1 subdirectory. Accordingly, client 248 may advantageously be provided access, as requested, in a more timely fashion as apposed to an un-partitioned /home directory, shown in FIG. 2A.

It is appreciated that the list of clients and programs seeking access may be updated as time goes on. For example, client 256 may be a new client that has sought shared access to the created subdirectory H2. However, the shared access request for the created subdirectory H2 by client 256 is denied since client 248 has exclusive access to the subdirectory H2. Thus, the access request by client 256 is queued to be granted at a later time, e.g., when client 248 has finished exclusively accessing the H2 subdirectory.

Figure 2C:
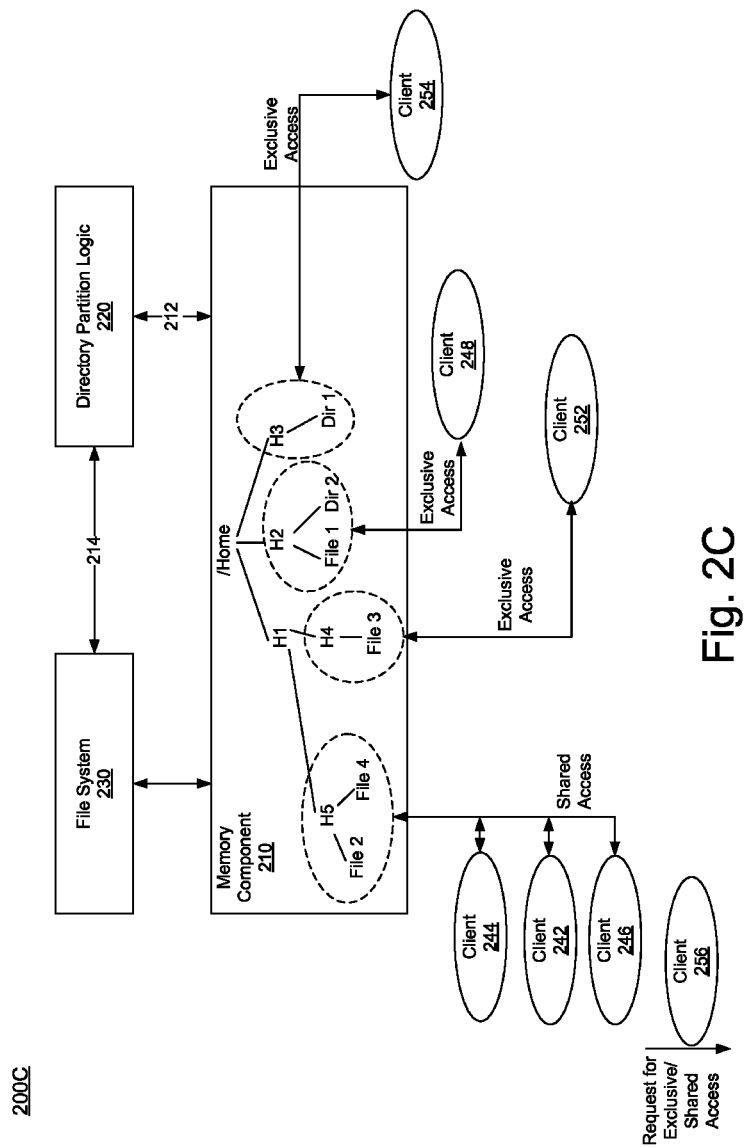

Referring now to FIG. 2C, an example partitioning of the /home directory in accordance with one embodiment is shown. For example, the triggering signal 214 generated by the directory partition logic 220 in one embodiment causes the file system 230 to partition the /home directory. For example, H1, H2, and H3 subdirectories may be created resulting from partitioning the /home directory. It is appreciated that the H1 subdirectory may further be partitioned to include an H4 and H5 subdirectories. Files 2 and 4 are placed within the H5 subdirectory and File 3 is placed within the H4 directory. It is appreciated that File 1 and Dir 2 are placed within the H2 subdirectory and Dir 1 is placed within the H3 directory.

As presented above, the names of the newly generated subdirectories may be based on hashing the name of the content within each subdirectory. For example, H5 subdirectory may be associated with hashing the names of Files 2 and 4. The H2 subdirectory may be associated with hashing the names of File 1 and Dir 2 while the H3 subdirectory may be associated with hashing the name associated with Dir 1. H4 subdirectory is created by hashing the name associate with File 3 in this exemplary embodiment. Moreover, as presented above, the generated subdirectories may be associated with one or more ranges of hash functions.

Partitioning the /home directory advantageously enables accommodation of additional users/clients. For example, clients 252 and 254 may access File 3 and Dir 1 respectively. It is appreciated that accesses by clients 252 and 254 is simultaneous with the accesses by clients 242, 244, 246, and 248.

Accordingly, the exclusive access request by clients 248, 252, and 254 that were previously queued may now be granted due to appropriate partitioning of the /home directory, thereby reducing the access wait time. In this exemplary embodiment, the clients 242 and 246 have shared access to subdirectory H5. Client 252 has exclusive access to subdirectory H4 and client 244 has shared access to subdirectory H5. It is appreciated that client 248 has exclusive to subdirectory H2 and client 254 has exclusive access to subdirectory H3.

It is appreciated that the list of clients and programs seeking access may be updated. For example, client 256 seeking a shared access to subdirectory H2 is denied access because client 248 has exclusive access to subdirectory H2. As such, the access request by client 256 is queued to be granted at a later time.

It is appreciated that new partitioning from a previously partitioned /home directory may occur. For example, the partitioned structure of the /home directory shown in FIG. 2C may result from partitioning of the /home directory structure of FIG. 2B. The process for partitioning the /home directory from FIG. 2B to 2C is substantially similar to the partitioning that takes place from FIG. 2A to 2B.

Figure 2D:
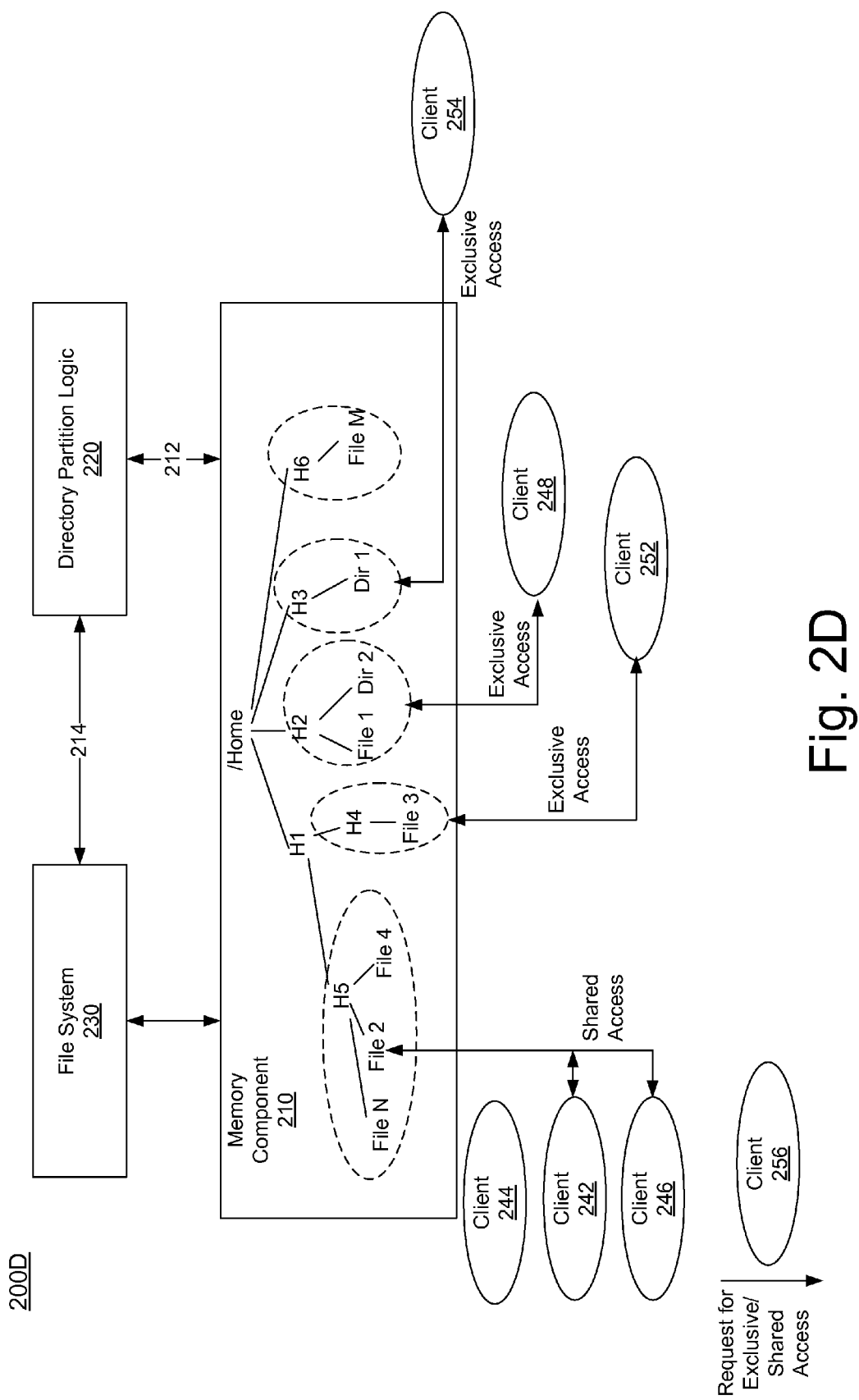

Referring now to FIG. 2D, the addition of more content to the /home directory and creating an additional subdirectory, in a similar fashion as described above, are shown. The operation and structure of FIG. 2D is substantially similar to FIG. 2C. However, Files M and N have been added to the /home directory. File N is placed under the H5 subdirectory because a hash associated with File N is within the range identified by the subdirectory H5. On the other hand, a new subdirectory H6 may be created for File M. It is therefore appreciated that addition or removal of content to the /home directory may cause the subdirectories to grow or to collapse.

Figure 2E:
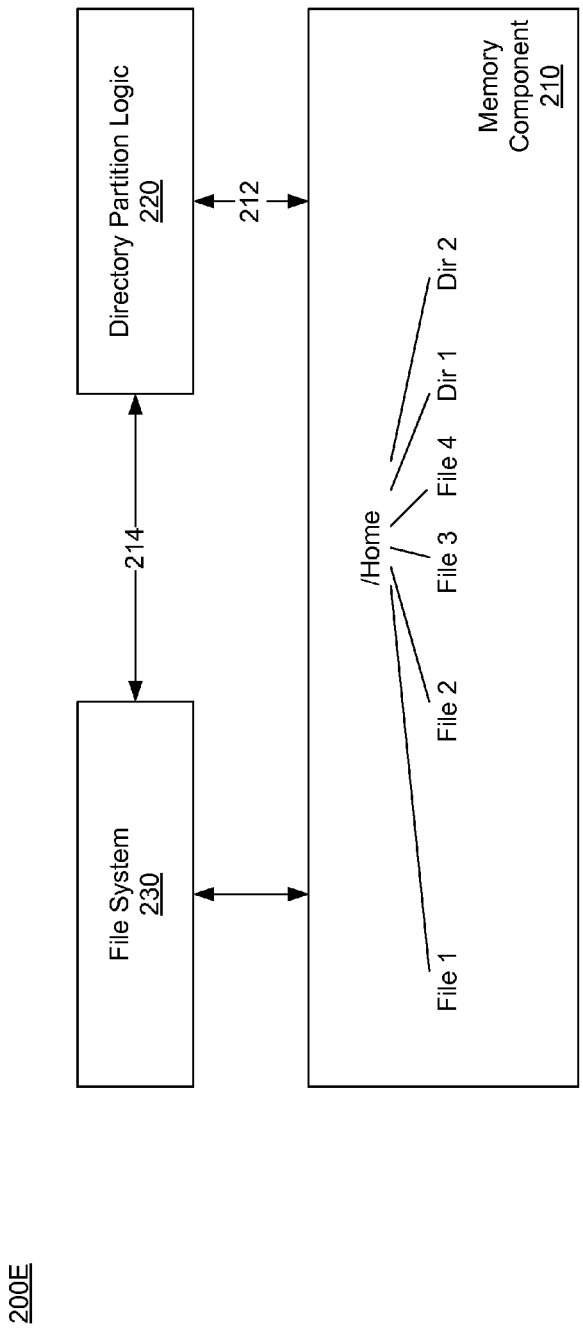

Referring now to FIG. 2E, which shows a collapse of the subdirectories shown in FIG. 2B to the original structure of /home directory, as presented in FIG. 2A. Thus, it is appreciated that based on monitoring accesses to the /home directory and/or monitoring access requests to the /home directory, the /home directory may be partitioned or restored back to its original form or further restored to a different partitioned structure.

Referring now to FIG. 3A, an exemplary embodiment of the directory partition logic 220 in accordance with an embodiment of the present invention is shown. The directory partition logic 220 includes monitoring logic 260 and partitioning logic 270. The directory partition logic 220 automatically monitors 212 the number of accesses and/or the number of access requests to the /home directory. It is appreciated that the access requests may include waiting, e.g., denied requests that are queued in a buffer to be granted later. The directory partition logic 220 automatically determines whether the /home directory is primed for partitioning. Accordingly, the directory partition logic 220 generates a trigger signal 214 to cause the file system 230 to partition the /home directory if the /home directory is primed for partitioning.

According to one embodiment, the monitoring logic 260 may include counters 262 and 264. In one embodiment, the counter 262 increments in response to every detected exclusive access and/or exclusive access request. For example, the counter 262 is incremented twice for one exclusive access that has been granted and for one exclusive access request that has not been granted and is queued for grant at a later time. In contrast, the counter 264 increments responsive to every shared access and/or shared access request. For example, the counter 264 is incremented three times for two shared accesses that have been granted and for one shared access request that has not been granted and is queued for grant at a later time.

It is appreciated that the counter 262 is decremented in response to every exclusive access and/or exclusive access request that has terminated. For example, the counter 262 is decremented by one when client 248 completes and terminates its exclusive access of /home directory. Similarly, the counter 264 is decremented responsive to every shared access and/or shared access request that has terminated. For example, the counter 264 is decremented by one when client 242 terminates its shared access of /home directory.

Accordingly, the monitoring logic 260 automatically tracks and monitors the number of accesses and the number of access requests to the /home directory. As presented above, it is appreciated that the access and/or access request may be either shared or exclusive.

The partitioning logic 270 includes a programmable threshold 272, a comparator 274, and a partitioning trigger 276. The programmable threshold 272 receives one or more programmable threshold values. The one or more programmable threshold values may be referred to as a plurality of heuristics and conditions to be satisfied before partitioning the /home directory. For example, one threshold value may be the maximum number of allowed exclusive accesses and/or the maximum number of exclusive access requests. In another embodiment, one threshold value may be the maximum number of allowed shared accesses and/or the maximum number of allowed shared access requests.

It is appreciated that a threshold value may be the total number of accesses and access requests, e.g., total number of exclusive and shared accesses as well as exclusive and shared access requests. Moreover, it is appreciated that the programmable threshold values may be user programmable and may be changed as needed.

The comparator 274 receives the monitored values of the counters 262 and 264. Moreover, the comparator 274 receives one or more threshold values from the programmable threshold 272.

The comparator 274 determines whether the /home directory is primed for partitioning by comparing the programmable threshold values to the monitored values. For example, the comparator 274 may determine that the /home directory is primed for partitioning if the number of exclusive accesses and the number of exclusive access requests received from the counter 262 exceed the maximum allowed amount, as indicated by a programmable threshold value. In one embodiment, the comparator 274 may determine that the /home directory is primed for partitioning if the number of shared accesses and the number of shared access requests received from the counter 264 exceed the maximum allowed amount, as indicated by a programmable threshold value.

It is appreciated that the threshold value may be any combination of exclusive/shared accesses and/or exclusive/shared access requests. For example, the comparator 274 may determine that the /home directory is primed for partitioning if the number of shared/exclusive accesses and shared/exclusive access requests received from the counters 262 and 264 exceed the maximum allowed amount, as indicated by a programmable threshold value. In one exemplary embodiment, the comparator 274 determines that the /home directory is primed for partitioning if the number of shared accesses and shared access requests exceed a first programmable threshold value and further if the number of exclusive accesses and exclusive access requests exceed a second programmable threshold value.

The determination of whether the /home directory is primed for partitioning is communicated to the partitioning trigger 276. The partitioning trigger 276 generates a triggering signal 214 when the /home directory is determined to be primed for partitioning. The triggering signal 214 is communicated to the file system 230 and causes the file system 230 to partition the /home directory in accordance with one embodiment.

Referring now to FIG. 3B, one exemplary embodiment of the directory partition logic 220 in accordance with one exemplary embodiment of the present invention is shown. The directory partition logic 220 is substantially similar to that of FIG. 3A. However, the directory partition logic 220 further includes a time tracker 266 component within the monitoring logic 260. The time tracker 266 tracks time for a specified amount of time at the end of which it is reset. For example, time tracker 266 tracks up to time $t_1$ and resets to zero and repeats.

The partitioning logic 270 further includes a threshold time comparator 278 that receives the tracked time from the time tracker 266. In one embodiment, the threshold time comparator 278 receives the result of the comparison of the number of accesses and/or the number of access requests with the plurality of heuristics. The threshold time comparator 278 further receives a programmable threshold time value. It is appreciated that the programmable threshold time value may be one of the programmable threshold values and part of the plurality of heuristics.

The threshold time comparator 278 compares the tracked time with the programmable time threshold value. The threshold time comparator 278 determines that the /home directory is primed for partitioning if the tracked time exceeds the programmable time threshold value and further if the comparator 274 determines that the number of accesses and/or the number of access requests, as discussed with respect to FIG. 3A, exceed the programmable threshold values. In other words, the threshold time comparator 278 determines that the /home directory is primed for partitioning if certain conditions, e.g., the number of accesses and/or the number of access requests, hold true for at least the programmable time threshold value.

The result of the determination by the comparator 278 is communicated to the partitioning trigger 276. The partitioning trigger 276 generates a partitioning signal 214 if the /home directory is primed for partitioning.

Figure 4A:
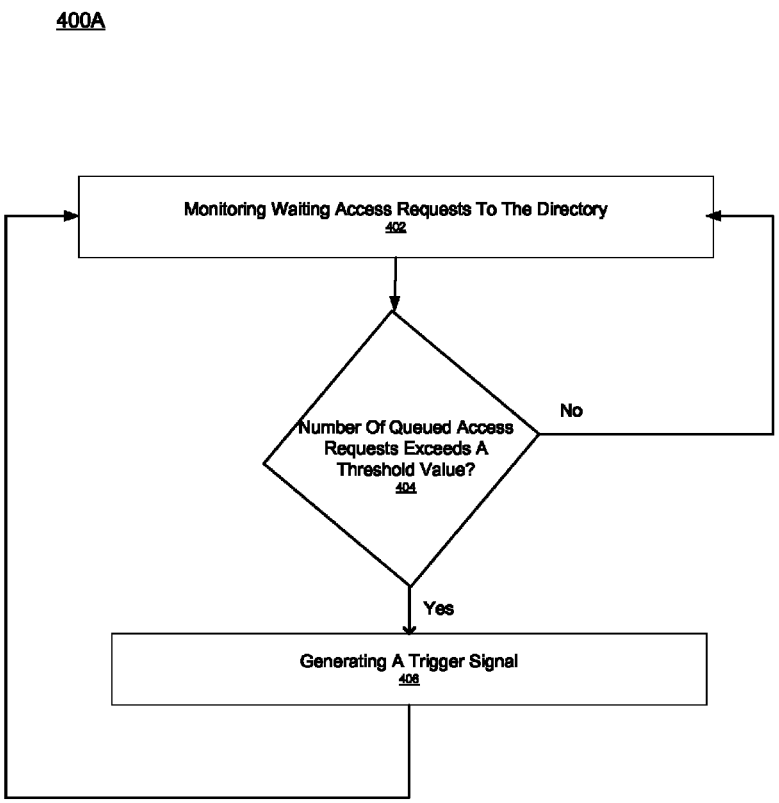
FIG. 4A is a flow diagram of an embodiment of the present invention that determines a directory is primed for partitioning when a number of queued access requests exceeds a threshold number.

FIG. 4A is a flow diagram 400A of an embodiment of the present invention that determines a directory is primed for partitioning when a number of queued access requests exceeds a threshold number. At step 402, waiting access requests to a directory, e.g., /home directory, are monitored. It is appreciated that the access requests may be for a shared access, an exclusive access, or any combination thereof. It is appreciated that the waiting access requests may be queued to be granted at a later time. At step 404, the number of queued access requests, e.g., shared access, exclusive access, or any combination thereof, may be compared to a threshold value.

It is appreciated that steps 402 and 404 are repeated if the number of queued access requests does not exceed the threshold value. At step 406, a trigger signal is generated if the number of queued access requests exceeds the threshold value. The trigger signal may cause the file system to partition the /home directory. It is appreciated that steps 402, 404, and 406 may be repeated for the partitioned /home directory and that the partitioned /home directory may be similarly partitioned to other partitioned directory.

Figure 4B:
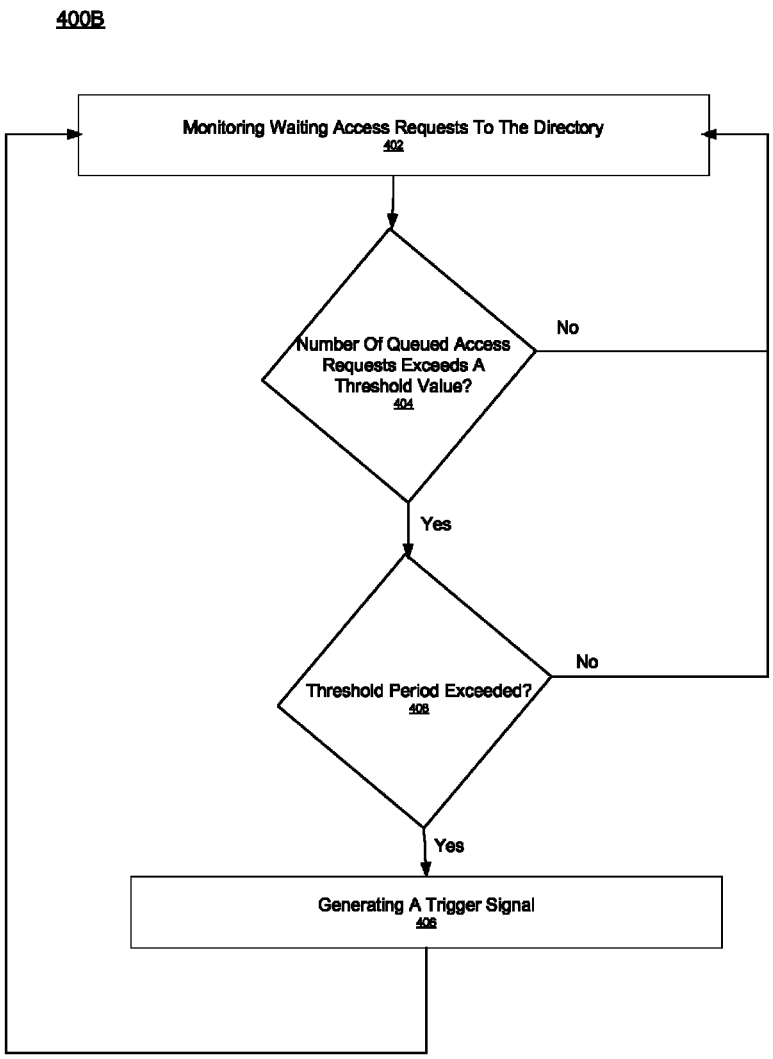
FIG. 4B is a flow diagram of an embodiment of the present invention that determines a directory is primed for partitioning when a number of queued access requests exceeds a threshold number over a threshold period of time.

FIG. 4B is a flow diagram 400B of an embodiment of the present invention that determines a directory is primed for partitioning when a number of queued access requests exceeds a threshold number over a threshold period of time. It is appreciated that the flow diagram 400B is substantially similar to that of 400A except that the trigger signal is generated if the number of queued access requests exceeds a threshold value and if this condition is satisfied for a threshold period of time at step 408. It is appreciated that steps 402 and 404 are repeated if the number of queued access requests does not exceed the threshold value. Moreover, it is appreciated that the steps 402, 404, and 408 may be repeated if the number of queued access requests exceeds the threshold value in less than the threshold period of time.

Figure 4C:
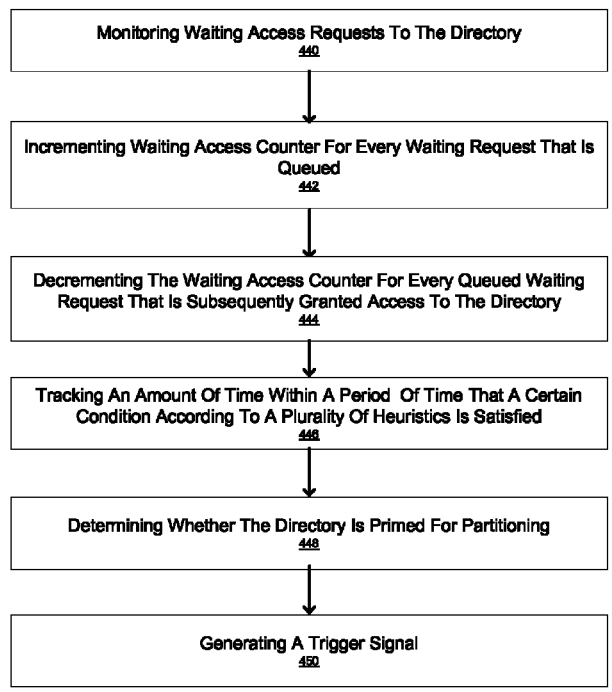
FIG. 4C shows an exemplary flow diagram in accordance with one embodiment of the present invention.

FIG. 4C shows an exemplary flow diagram 400C in accordance with one embodiment of the present invention. At step 440, waiting requests to access one or more content within the /home directory is monitored. The waiting requests may be queued in a buffer to be granted at a later time. At step 442, the waiting, e.g., denied, requests may be monitored by incrementing an waiting access counter for every waiting request that is queued. It is appreciated that the requests to access may be for a shared access, exclusive access or any combination thereof. At step 444, the waiting access counter is decremented for every queued waiting request that is subsequently granted access to the /home directory.

Optionally at step 446, an amount of time within a period that a certain condition or conditions are satisfied is tracked. The conditions may be based on the comparison of the monitored values, e.g., from steps 440, 442, 444 or any combination thereof, and a plurality of heuristics that may be user programmable. For example, the plurality of heuristics may include a threshold value associated with the number of shared access requests. The plurality of heuristics may further include a threshold value associated with the number of exclusive access requests. It is appreciated that the plurality of heuristics may further include a threshold value for the number of exclusive access requests, the number of shared access requests, or any combination thereof.

At step 448, it is determined whether the /home directory is primed for partitioning. It is appreciated that the determination may be based on whether the condition or conditions specified by the plurality of heuristics are satisfied. For example, it may be determined that the /home directory is primed for partitioning if a number of waiting requests to access the /home directory is greater than a threshold value. In one embodiment, it may be determined that the /home directory is primed for partitioning if the number of waiting requests to access the /home directory is greater than a threshold value for at least a certain amount of time.

At step 450, a trigger signal is generated if the directory is primed for partitioning. The trigger signal may cause a file system to partition the /home directory.

Accordingly, a directory is partitioned in response to a surge in the number of access requests for a period of time. As a result, the wait time to process access requests are reduced.

Figure 5:
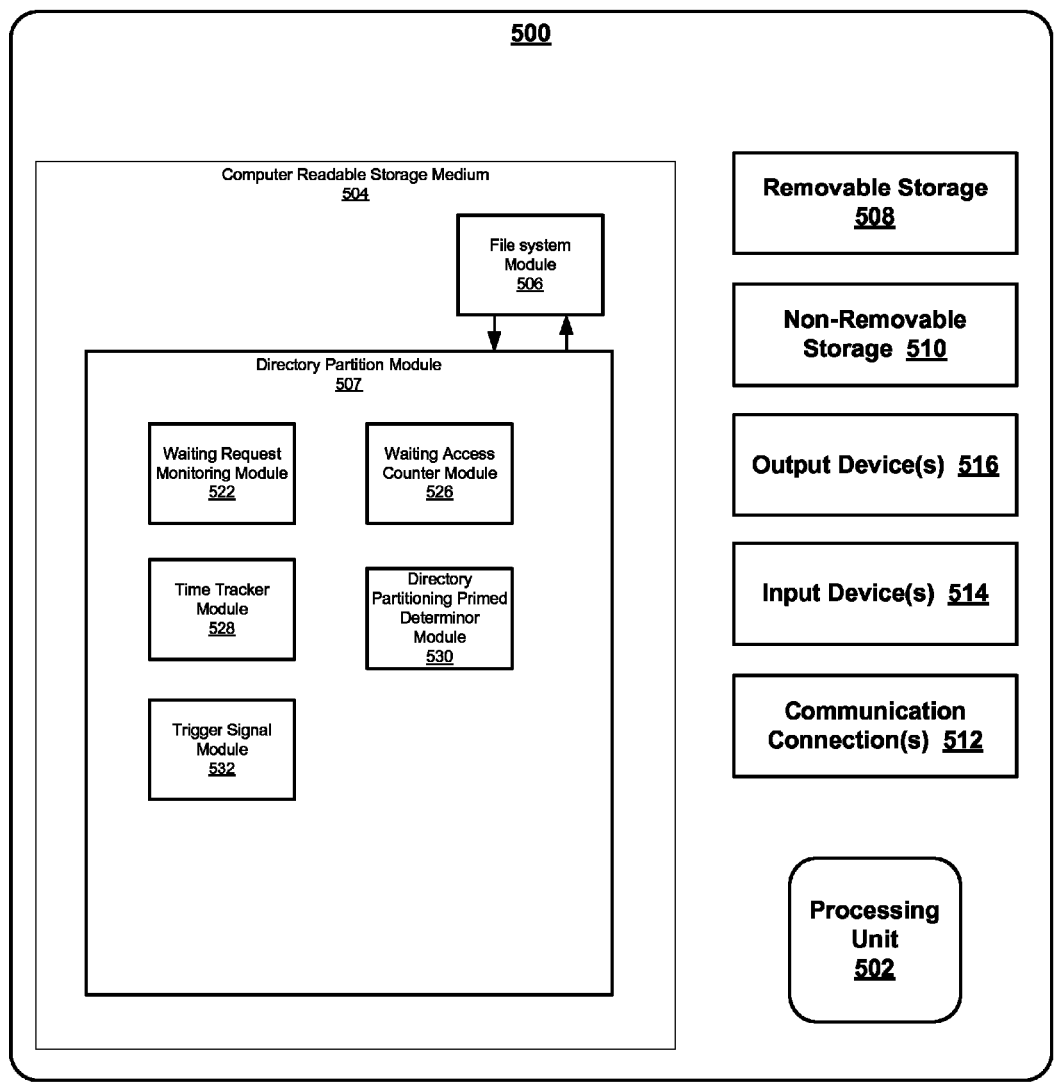
FIG. 5 shows a block diagram of an exemplary computer system in accordance with one embodiment of the present invention.

Referring now to FIG. 5, a block diagram of an exemplary computer system in accordance with one embodiment of the present invention is shown. With reference to FIG. 5, an exemplary system module for implementing embodiments includes a general purpose computing system environment, such as computing system environment 500. Computing system environment 500 may include, but is not limited to, servers (e.g., servers 106a-b), desktop computers, laptops, tablet PCs, mobile devices, and smartphones. In its most basic configuration, computing system environment 500 typically includes at least one processing unit 502 and computer readable storage medium 504. Depending on the exact configuration and type of computing system environment, computer readable storage medium 504 may be volatile (such as RAM), non-volatile (such as ROM, flash memory, etc.) or some combination of the two. Portions of computer readable storage medium 504 when executed facilitates the determination of whether a directory is primed for partitioning according to embodiments of the present invention (e.g., process 400).

Additionally, computing system environment 500 may also have additional features/functionality. For example, computing system environment 500 may also include additional storage (removable and/or non-removable) including, but not limited to, magnetic or optical disks or tape. Such additional storage is illustrated by removable storage 508 and non-removable storage 510. Computer storage media includes volatile and nonvolatile, removable and non-removable media implemented in any method or technology for storage of information such as computer readable instructions, data structures, program modules or other data. Computer readable medium 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system environment 500. Any such computer storage media may be part of computing system environment 500.

Computing system environment 500 may also contain communications connection(s) 512 that allow it to communicate with other devices. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Communications connection(s) 512 may allow computing system environment 500 to communication over various networks types including, but not limited to, fibre channel, small computer system interface (SCSI), Bluetooth, Ethernet, Wi-fi, Infrared Data Association (IrDA), Local area networks (LAN), Wireless Local area networks (WLAN), wide area networks (WAN) such as the internet, serial, and universal serial bus (USB). It is appreciated the various network types that communication connection(s) 512 connect to may run a plurality of network protocols including, but not limited to, transmission control protocol (TCP), internet protocol (IP), real-time transport protocol (RTP), real-time transport control protocol (RTCP), file transfer protocol (FTP), and hypertext transfer protocol (HTTP).

Computing system environment 500 may also have input device(s) 514 such as a keyboard, mouse, pen, voice input device, touch input device, remote control, etc. Output device(s) 516 such as a display, speakers, etc. may also be included. All these devices are well known in the art and are not discussed at length.

In one embodiment, computer readable storage medium 504 includes a directory partition module 507 which includes an access monitoring module 520, a waiting request monitoring module 522, an access counter module 524, a waiting access counter module 526, a time tracker module 528, a directory partitioning primed determinor module 530, and a trigger signal module 532. The directory partition module 507 communicates with a file system module 506 that may be integrated within the file system module 506.

The access monitoring module 520 monitors the number of exclusive accesses, the number of shared accesses, or any combination thereof according to embodiments of the present invention. The waiting request monitoring module 522 monitors the number of exclusive access requests, the number of shared access requests, or any combination thereof according to embodiments of the present invention. For example, access counter module 524 may be used to increment/decrement based on the number of accesses. It is appreciated that the waiting access counter module 526 may be used to increment/decrement based on the number of access requests. The time tracker 528 module operates substantially similar to the time tracker 266. The directory partitioning primed determinor module 530 operates substantially similar to the comparators 274 and/or threshold time comparator 278 or any combination thereof. The trigger signal module 532 operates substantially similar to the partitioning trigger 276 component.

Figure 6:
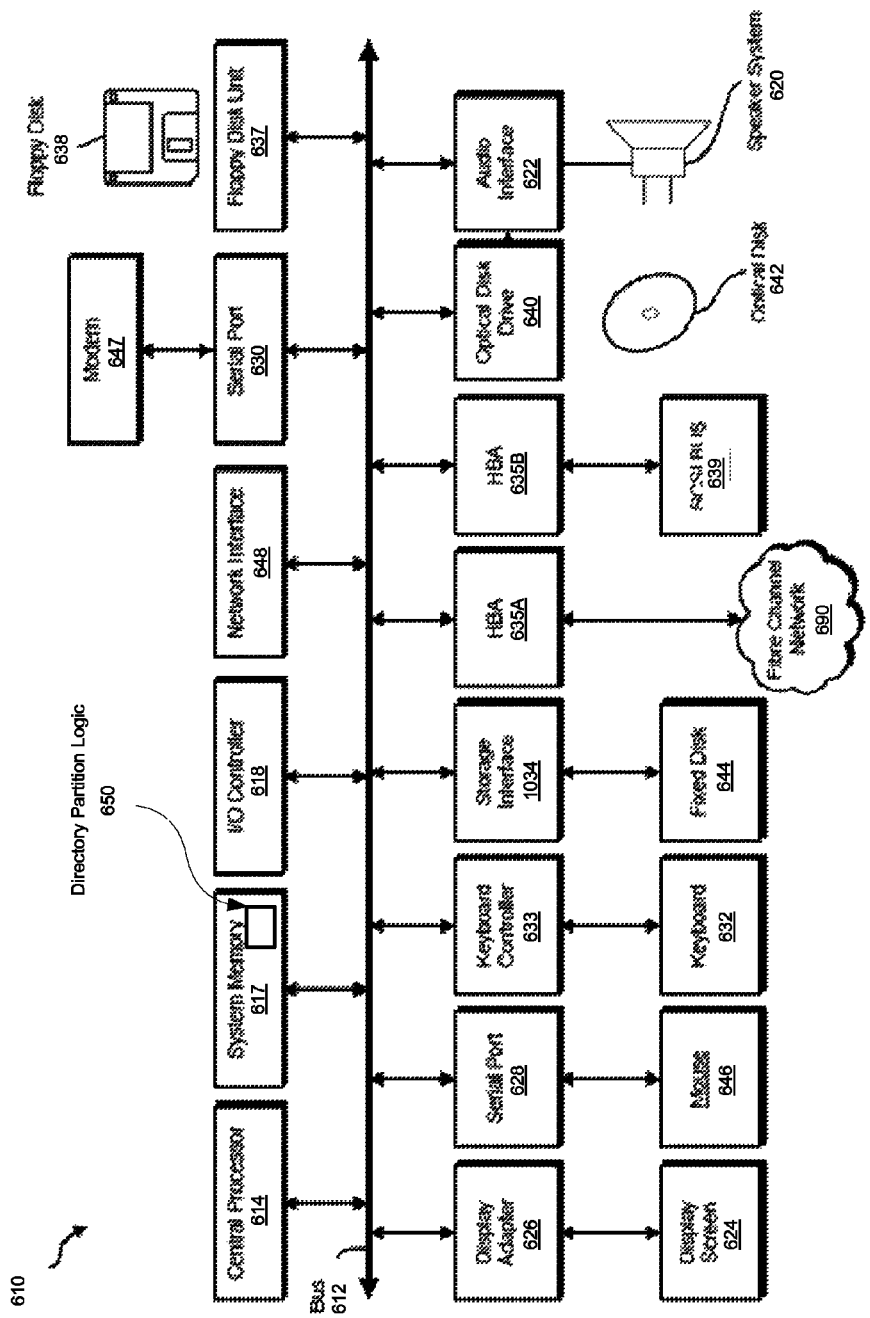
FIG. 6 shows a block diagram of another exemplary computer system in accordance with one embodiment of the present invention.

Referring now to FIG. 6, a block diagram of another exemplary computer system in accordance with one embodiment of the present invention is shown. FIG. 6 depicts a block diagram of a computer system 610 suitable for implementing the present disclosure. Computer system 610 includes a bus 612 which interconnects major subsystems of computer system 610, such as a central processor 614, a system memory 617 (typically RAM, but which may also include ROM, flash RAM, or the like), an input/output controller 618, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612). System memory 617 includes directory partition module 650 which is operable to partition directories according to embodiments of the present invention.

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer readable medium, such as a hard disk drive (e.g., fixed disk 644), an optical drive (e.g., optical drive 640), a floppy disk unit 637, or other storage medium. Additionally, applications can be in the form of electronic signals modulated in accordance with the application and data communication technology when accessed via network modem 647 or interface 648.

Storage interface 634, as with the other storage interfaces of computer system 610, can connect to a standard computer readable medium for storage and/or retrieval of information, such as a fixed disk drive 644. Fixed disk drive 644 may be a part of computer system 610 or may be separate and accessed through other interface systems. Modem 647 may provide a direct connection to a remote server via a telephone link or to the Internet via an internet service provider (ISP). Network interface 648 may provide a direct connection to a remote server via a direct network link to the Internet via a POP (point of presence). Network interface 648 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 6 need not be present to practice the present disclosure. The devices and subsystems can be interconnected in different ways from that shown in FIG. 6. The operation of a computer system such as that shown in FIG. 6 is readily known in the art and is not discussed in detail in this application. Code to implement the present disclosure can be stored in computer-readable storage media such as one or more of system memory 617, fixed disk 644, optical disk 642, or floppy disk 638. The operating system provided on computer system 610 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of determining when to partition a directory, said method comprising:
    monitoring accesses to said directory, wherein said directory comprises a listing of files;
    monitoring waiting requests to access said directory, wherein said waiting requests are queued to be granted;
    counting waiting requests to access said directory, wherein a first counter tracks exclusive access requests to said directory and a second counter tracks shared access requests to said directory, wherein said directory is primed for partitioning upon determining that one of the first and second counters is greater than a threshold value related to a plurality of heuristics, wherein said threshold value is lower for said first counter than for said second counter; and
    generating a trigger if said directory is primed for partitioning, wherein said trigger is configured to cause a file system to partition said directory.

2. The method as described in claim 1, wherein said monitoring waiting requests to access said directory comprises examining a number of wait entries within a wait queue for reader-writer lock associated with said directory.

3. The method as described in claim 1, wherein said monitoring waiting requests to access said directory comprises:
    incrementing a waiting access counter for every waiting request that is queued; and
    decrementing said waiting access counter for every queued waiting request that is subsequently granted access said directory.

4. The method as described in claim 1, wherein said plurality of heuristics is user programmable.

5. The method as described in claim 1, wherein said waiting requests to access said directory comprise shared access requests.

6. The method as described in claim 1, wherein said waiting requests to access said directory comprise exclusive access requests.

7. The method as described in claim 1, wherein said waiting requests to access said directory comprise exclusive access requests and shared access requests.

8. The method as described in claim 1 further comprising:
    tracking an amount of time over which a number of waiting requests to access said directory is greater than a threshold value; and
    wherein said directory is primed for partitioning upon determining that said amount of time exceeds a prescribed time period threshold associated with said plurality of heuristics.

9. A non-transitory computer readable storage medium having stored thereon computer executable instructions that, if executed by a computer system, cause the computer system to perform a method of determining if a directory is to be partitioned, said method comprising:
    monitoring accesses to said directory, wherein said directory comprises a listing of files;
    monitoring waiting requests to access said directory, wherein said waiting requests are queued to be granted;
    counting waiting requests to access said directory, wherein a first counter tracks exclusive access requests to said directory and a second counter tracks shared access requests to said directory, wherein said directory is primed for partitioning upon determining that one of the first and second counters is greater than a threshold value related to a plurality of heuristics, wherein said threshold value is lower for said first counter than for said second counter; and
    generating a trigger if said directory is primed for partitioning, wherein said trigger is configured to cause a file system to partition said directory.

10. The computer readable storage medium as described in claim 9, wherein said monitoring waiting requests to access said directory comprises examining a number of wait entries within a wait queue for reader-writer lock associated with said directory.

11. The computer readable storage medium as described in claim 9, wherein said monitoring waiting requests to access said directory comprises:
    incrementing a waiting access counter for every waiting request that is queued; and
    decrementing said waiting access counter for every queued waiting request that is subsequently granted access to said directory.

12. The computer readable storage medium as described in claim 9, wherein said waiting requests to access one or more content within said directory comprise shared access requests.

13. The computer readable storage medium as described in claim 9, wherein said waiting requests to access one or more content within said directory comprise exclusive access requests.

14. The computer readable storage medium as described in claim 9, wherein said waiting requests to access said directory comprise exclusive access requests and shared access requests.

15. The computer readable storage medium as described in claim 9, wherein said method further comprises:
tracking an amount of time over which a number of waiting requests to access said directory is greater than a threshold value; and
wherein said directory is primed for partitioning upon determining that said amount of time exceeds a prescribed time period threshold associated with said plurality of heuristics.

16. A directory partition system, comprising:
at least one computer processor configured to:
monitor accesses to one or more content within a directory, wherein said directory comprises a listing of files;
monitor waiting requests to access said directory, wherein said waiting requests are queued to be granted;
counting waiting requests to access said directory, wherein a first counter tracks exclusive access requests to said directory and a second counter tracks shared access requests to said directory, wherein said directory is primed for partitioning upon determining that one of the first and second counters is greater than a threshold value related to a plurality of heuristics, wherein said plurality of heuristics is user programmable, wherein said threshold value is lower for said first counter than for said second counter; and
generate a trigger if said directory is primed for partitioning, wherein said trigger is configured to cause said directory to become partitioned;
at least one memory, coupled to the at least one computer processor, configured to provide the at least one computer processor with instructions.

17. The directory partition system as described in claim 16, wherein said at least one computer processor is further configured to increment responsive to every waiting request that is queued, and to decrement responsive to every queued waiting request that is subsequently granted access to said directory.

18. The directory partition system as described in claim 16, wherein said at least one computer processor is further configured to examine a number of wait entries within a wait queue for reader-writer lock associated with said directory.

19. The directory partition system as described in claim 16, wherein said waiting requests to access one or more content within said directory comprise shared access requests and exclusive access requests.

20. The directory partition system as described in claim 16 wherein said at least one computer processor is further configured to track an amount of time over which a number of waiting requests to access said directory is greater than a threshold value, and determine that said directory is primed for partitioning when said amount of time exceeds a prescribed time period threshold associated with said plurality of heuristics.

* * * * *